United States Patent [19]
Caulk, Jr.

[11] Patent Number: 5,737,562
[45] Date of Patent: Apr. 7, 1998

[54] CPU PIPELINE HAVING QUEUING STAGE TO FACILITATE BRANCH INSTRUCTIONS

[75] Inventor: Robert L. Caulk, Jr., Livermore, Calif.

[73] Assignee: LSI Logic Corporation, Milpitas, Calif.

[21] Appl. No.: 540,382

[22] Filed: Oct. 6, 1995

[51] Int. Cl.[6] ............................................. G06F 9/30
[52] U.S. Cl. ................... 395/394; 395/392; 395/393
[58] Field of Search ............................. 395/392, 393, 395/394

[56] References Cited

U.S. PATENT DOCUMENTS

| | | | |
|---|---|---|---|
| 5,325,495 | 6/1994 | McLellan | 395/395 |
| 5,450,555 | 9/1995 | Brown, III et al. | 395/394 |
| 5,471,591 | 11/1995 | Edmondson et al. | 395/393 |
| 5,490,255 | 2/1996 | Rawlinson et al. | 395/395 |
| 5,619,664 | 4/1997 | Glew | 395/394 |

*Primary Examiner*—Krisna Lim
*Attorney, Agent, or Firm*—Henry K. Woodward; Townsend and Townsend and Crew LLP

[57] ABSTRACT

A pipelined microprocessor is provided with a queuing stage between an instruction fetch stage and an instruction decode stage to facilitate branch instructions and to receive instructions from the fetch stage when the decode stage is stalled. If a branch is incorrectly anticipated the queuing stage has nonbranch sequential instructions for the decode stage while the fetch stage is restarted at the nonbranch sequential instruction stream.

11 Claims, 2 Drawing Sheets

CPU PIPELINE HAVING QUEUING STAGE TO FACILITATE BRANCH INSTRUCTIONS

BACKGROUND OF THE INVENTION

This invention relates generally to computer systems, and more particularly the invention relates to a pipelined central processing unit having a queue stage to facilitate the handling of branch instructions.

Disclosed in copending application Ser. No. 08/540,336, filed Oct. 6, 1995, now U.S. Pat. No. 5,603,047 issued Feb. 11, 1997 is a superscalar mips processor architecture which operates in a pipeline mode of instruction fetch and execution. One difficulty with a pipelined operation is the handling of branch instructions. Typically, a branch instruction will cause an abortion of instructions already in the pipeline. Thus some processors are equipped with complex prediction schemes requiring complex hardware to anticipate branch instructions.

The present invention incorporates a queuing stage in the pipeline of the superscalar mips processor, for example, to provide performance increase with a minimum of additional hardware.

SUMMARY OF THE INVENTION

In accordance with the invention, a queue (Q) stage is provided between an instruction fetch stage and an instruction decode stage to facilitate branch instructions.

In the preferred embodiment, an instruction fetch (IF) stage provides two instructions per cycle for a dual pipeline operation. The instructions are fetched from an instruction queue or from memory through a bus interface unit.

The Q stage can be active or inactive. When active, it receives the next sequential instruction pair and a virtual address. The queue handles efficiently the multiple cases for branch instructions and minimizes the number of cycles in order to resolve a resource conflict. When the queue stage is inactive, the queue is bypassed and subsequent instruction pairs are directly passed to a decode/read (RD) stage.

When a branch instruction type is encountered and the queue stage is active, the branch is predicted to be taken and the IF stage starts at the branch address. At this point, the queue stage holds the next nonbranch instructions to execute. The branch target enters the RD stage, bypassing the queue stage. When the branch instruction enters the execute stage, the branch condition is resolved. If the branch was correctly predicted, then the instructions in the queue stage are cancelled. If the branch was incorrectly predicted, then the branch target is cancelled. In this case, the nonbranch sequential instructions are taken from the queue stage, and the IF stage is restarted at the nonbranch sequential stream. This means that a branch instruction which is correctly predicted and the queue stage is full will have no cycle penalty associated with it. In the case where the branch is incorrectly predicted the branch will have a one-cycle penalty.

The invention and objects and features thereof will be more readily apparent from the following detailed description and dependent claims when taken with the drawings.

DETAILED DESCRIPTION OF THE ILLUSTRATIVE EMBODIMENT

Figure 1:
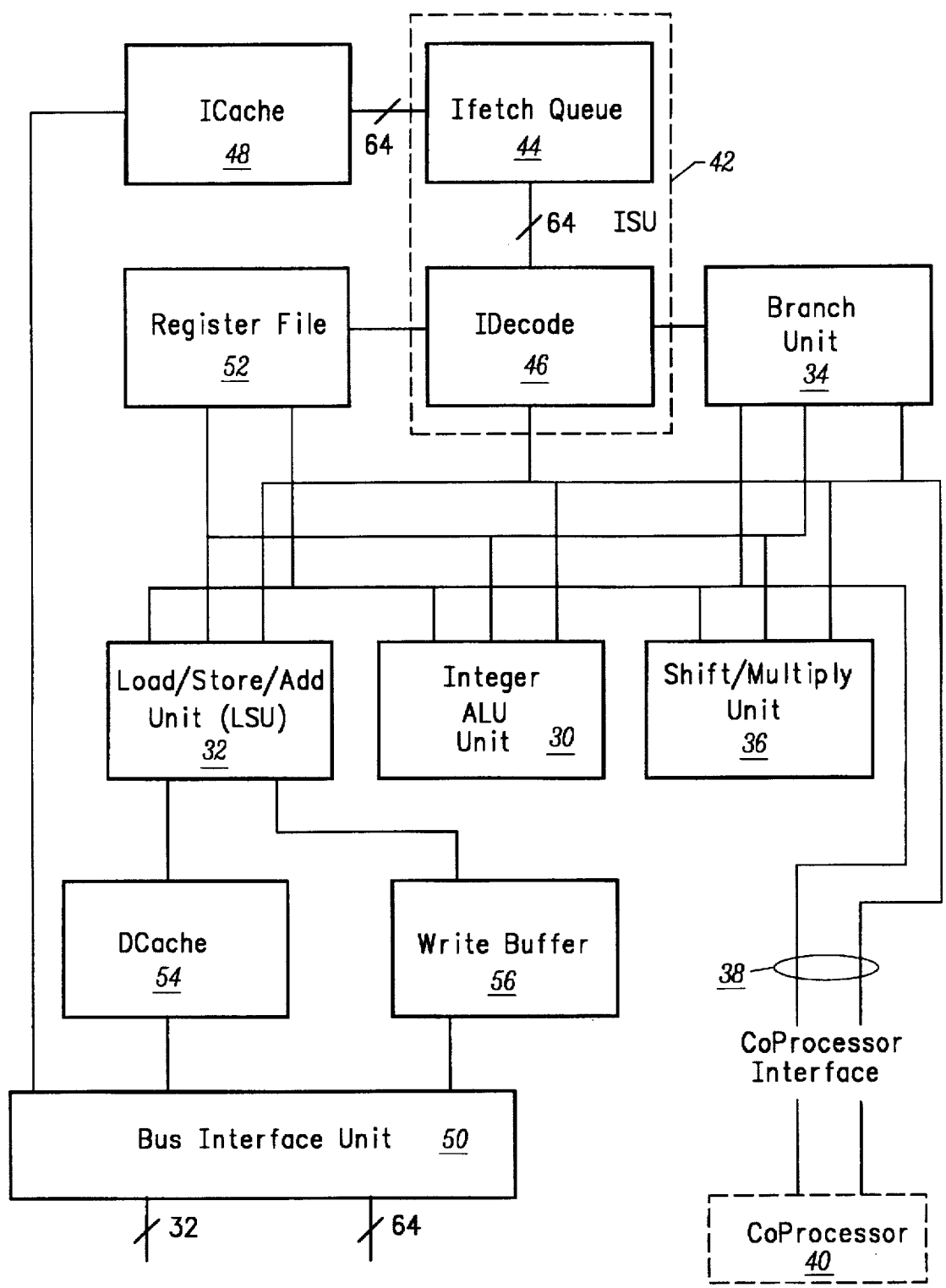
FIG. 1 is a functional block diagram of a dual pipeline CPU in which the invention can be implemented.

FIG. 1 is a functional block diagram of a dual pipeline microprocessor in which a queue stage in accordance with the invention can be employed. The machine can issue and retire two instructions per cycle using a combination of five independent execution units: ALU 30 load/store/add unit (LSU) 32 which executes, loads and stores and can also execute, add and load immediate instructions, branch unit 34, multiply/shift unit 36 and coprocessor interface 38 with a coprocessor 40. The instruction scheduling unit (ISU) 42 includes Ifetch queue (Q) unit 44 and Idecode unit 46. An instruction cache 48 is connected between a bus interface unit 50 and queue stage 44. The bus interface unit 50 manages the flow of instructions and data between the core and the system via the SC bus interface. A register file 52 contains the general purpose registers of the core. It supplies source operands to the execution units and handles the storage of results to target registers. A data cache 54 and write buffer 56 are connected between bus interface unit 50 and LSU unit 32.

Ifetch queue 44 optimizes the supply of instructions to the microprocessor even across breaks in the sequential flow of execution (i.e., jumps and branches). Idecode unit 46 decodes instructions from the Ifetch queue, determines the actions required for the instruction execution, and manages the register file 52, LSU 32, ALU 30, and multiply unit 36 accordingly. Branch unit 34 is used when branch instructions are recognized within the instruction stream.

LSU unit 32 manages loads and stores of data values. Loads come from either the decache 54 or the SC bus interface 50 in the event of a decache miss. Stores pass to the decache and SC bus interface through the right buffer 56. LSU unit 32 also performs a restricted set of arithmetic operations, including the addition of an immediate offset as required in address calculations. The integer ALU unit 30 calculates the result of an arithmetic or a logic operation, while the multiplier/shift unit 36 performs multiply and divide operations. Thus all three units perform logical, arithmetic, and data movement operations.

Coprocessor interface 38 allows the attachment of a tightly coupled, special purpose coprocessor 40 to enhance the microprocessor's general purpose computational power. Using this approach, high performance application specific hardware can be made directly accessible to a programmer at the instruction set level. For example, coprocessor 40 might offer accelerated bitmapped graphics operations or realtime video compression. A cache invalidation interface (FIG. 1) allows supporting hardware outside of the microprocessor core to maintain the coherency of onboard cache contents for systems that include multiple main bus masters.

Figure 2:
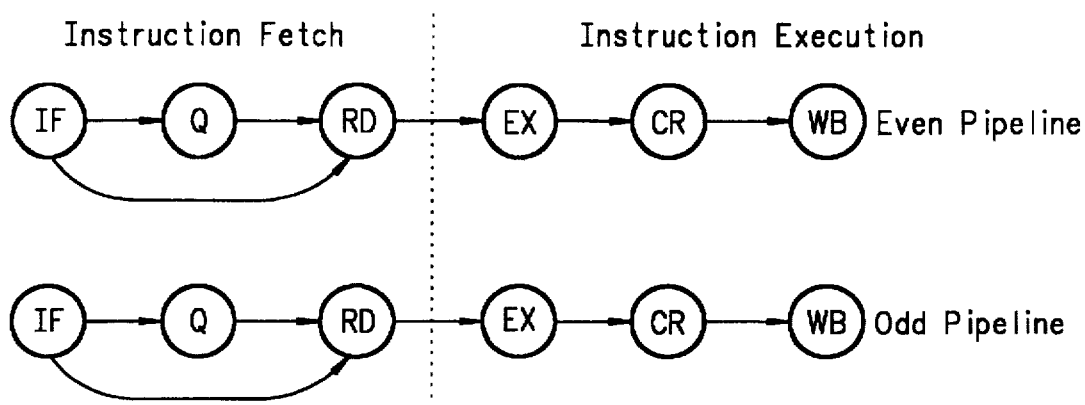
FIG. 2 illustrates a dual pipeline of the CPU of FIG. 1.

FIG. 2 illustrates the dual pipeline architecture of the core. The two concurrent pipelines (even and odd) each have six stages. The first three stages comprise the instruction fetch phase and the last three stages comprise the instruction execution stage. In general, the execution of a single instruction consists of the following stages:

1. IF (instruction fetch) fetches the instruction.
2. Q (queuing) provides a conditional stage in which instructions may enter if they deal with branches or register conflicts. An instruction that does not cause a branch or register conflict is fed directly to the RD stage.
3. RD (read) reads any required operands from the register file while the instruction is decoded.

4. EX (execute) executes all instructions. Conditional branches are resolved in this cycle. The address calculation for load and store instruction are performed in this stage.
5. CR (cache read) is used to read the cache for load and store instructions. Data returned to the register bypass logic at the end of this stage.
6. WB (write back) is a register file in which results are written.

Each stage, once it has accepted an instruction from the previous stage, can hold the instruction for reexecution in case of pipeline stalls.

This circuitry is able to fetch and issue two instructions per cycle to the execute stage. Instructions are fetched as double word aligned pairs: slot-0 and slot-1. In the instruction decode stage, there is a two-instruction window. When only slot-0 can be scheduled because slot-1 has a dependency, then the window slides down one instruction. Thus although instructions are always fetched as double word pairs, they are scheduled on single word boundaries. Primary emphasis is placed on execution of branch instructions with minimal penalty. This is the primary function of the queue stage. In general, the queue stage is filled whenever the RD stage has a stall. This can occur fairly often for register conflicts, cache misses, resource conflicts, and the like. Filling the queue stage in this case allows the IF stage to work ahead one cycle.

When a branch instruction is encountered and the queue stage is active, the branch is predicted to be taken and IF starts at the branch address. At this point, the queue stage holds the next non-branch instructions to evaluate. The branch target enters the RD stage, bypassing the queue stage. When the branch instruction enters the execute stage, the branch condition is resolved. If the branch was correctly predicted, then the instructions in the queue stage are cancelled. If the branch was incorrectly predicted, then the branch target is cancelled. In this case, the non-branch sequential instructions are taken from the queue stage, and the IF stage restarts at the non-branch sequential stream. In general, this means that a branch instruction which is correctly predicted from the even 1 slot and the queue stage is full, will have no cycle penalty associated with it. In the case where the branch is incorrectly predicted the branch has a one cycle penalty.

If the branch instruction is in the odd one slot, then the branch delay slot instruction will always execute by itself, with no chance to fill the other execution slot.

The branch prediction logic is capable of looking at two instruction at a time, from either the queue latches or the RD latches, depending on whether the queue stage is active. From the two instructions, if one is a branch, then the offset in that instruction is passed into a dedicated Addr to calculate the branch address for the IF stage instruction fetch. Since this is done speculatively, the non-branch value of the PC is also saved for the possible restart of the sequential instructions from the queue stage.

Once an instruction pair has been allowed to pass into the RD stage, it is decoded and at the same time the register source addresses are passed to the register file for reading operands. Register dependencies and resource dependencies are checked in this stage. If the instruction in slot-0 has no dependency on a register or resource currently tied up by previous instruction, then it will be passed immediately into the EX stage where it forks to the appropriate execution unit. The instruction in slot-1 may also be dependent on a resource or register in slot-0, so it must be checked for dependencies against both slot-0 and any previous not retired instruction. If either instruction must be held in the RD stage, then if the queue stage is not full, the IF stage will be allowed to continue in order to fill the queue stage. If the queue stage is full, then the queue and IF stages will be frozen or stalled. Register bypass opportunities are considered in the RD stage, and the bypass multiplexors control signals are set for potential bypass cases from a previous instruction which is still in the pipeline. For instruction execution, the pair of instructions or a single instruction when there was a previous block, are individually passed to the independent execution units. Each execution unit receives operands from the register bypass logic and an instruction from the instruction scheduler. Each instruction spins one run cycle in an execution unit. In the case of ALU and other single cycle instructions, the result is then fed to the register/bypass unit for the CR stage.

Figure 3:
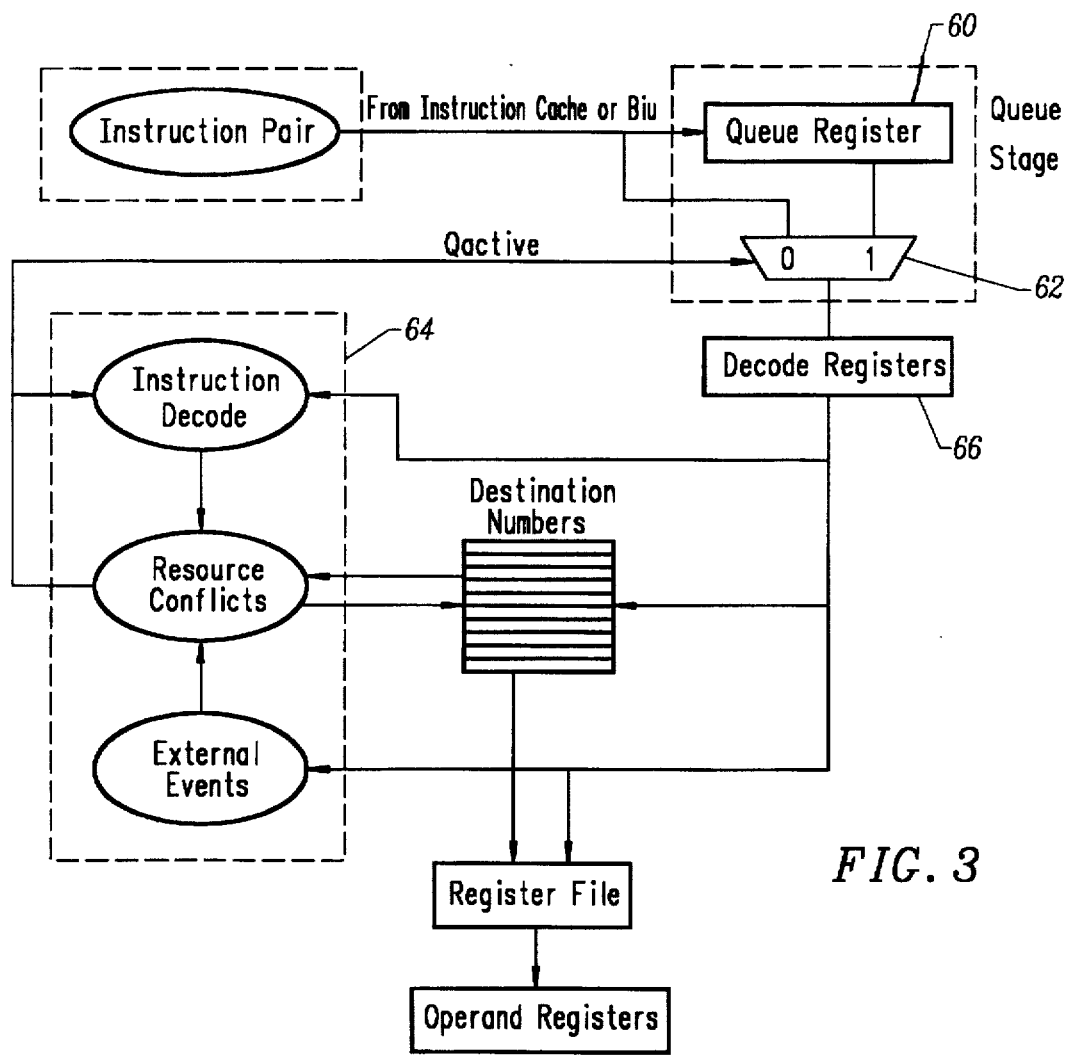
FIG. 3 illustrates instruction flow from a fetch stage (IF) to execution stage (EX) in which the queue stage can be active or bypassed.

FIG. 3 illustrates the instruction flow from fetch to execution and the structure of the queue stage including queue registers 60 and mux 62. The instruction decode or resource conflicts in the circuitry 64 of the register file unit can control mux 62 whereby instructions from the cache or BIU bypass queue registers 60 and proceed directly to the decode registers 66. Thus incorporation of the queue stage in accordance with the invention requires only the addition of queue registers 60 and the mux 62 whereby the queue registers can be selectively bypassed.

The pipelined central processing unit including a queuing stage in accordance with the invention facilitates the execution of branch instructions and resource conflicts with minimal increase in hardware. While the invention has been described with reference to a specific embodiment, the description is illustrative of the invention and is not to be construed as limiting the invention. Various modifications and applications may occur to those skilled in the art without departing from the true spirit and scope of the invention as defined in the claims.

What is claimed is:
1. A pipelined processor comprising:
   a) an instruction fetch stage for fetching instructions for execution,
   b) an instruction decode stage for receiving and decoding fetched instructions,
   c) an instruction execution stage for executing instructions, and
   d) a queue stage connected between said instruction fetch stage and said instruction decode stage for storing instructions related to branches and instructions related to resource conflicts.
2. The pipelined processor as defined by claim 1 wherein said queue stage comprises a plurality of registers having register inputs and register outputs, a multiplexor having a first input coupled to said register outputs and a second input coupled to said register inputs, whereby said multiplexor can bypass said registers in transmitting instructions from said fetch stage to said decode stage.
3. The pipelined processor as defined by claim 1 wherein said queue stage is activated when said decode stage stalls.
4. The pipelined processor as defined by claim 1 and further including:
   e) a cache read stage for receiving load and store instructions after instruction execution, and
   f) a write back stage for writing results of said execution stage.
5. The improvement as defined by claim 2 and further including:
   a cache read stage for receiving load and store instructions after instruction execution, and a write back stage for writing results of said execution state.

6. The improvement as defined by claim 5 wherein said queue stage is activated when said decode stage stalls.

7. In a pipelined processor having an instruction fetch stage, an instruction decode stage, and an instruction execute stage, the improvement comprising a queuing stage between said instruction fetch stage and said instruction decode stage and having an active state and an inactive state, said queuing stage storing instructions related to branches to facilitate timing when a branch is incorrectly predicted.

8. The improvement as defined by claim 7 wherein said queuing stage is activated and loaded with instructions when said decode stage stalls.

9. The improvement as defined by claim 7 wherein said instruction fetch stage starts at a branch address when a branch instruction is encountered and said queuing means holds a next non-branch instruction, said branch instruction bypassing said queuing stage and entering said decode stage and said execution stage where a branch condition is resolved, if said branch is accurately predicted the queuing stage is clear, and if the branch is inaccurately predicted then the branch operation is cancelled and the non-branch sequential instructions are taken from said queuing stage and passed to said instruction decode stage, whereby an incorrectly predicted branch has a limited cycle penalty.

10. The improvement as defined by claims 9 wherein said queuing stage is activated and loaded with instructions when said decode stage stalls.

11. The improvement as defined by claim 9 wherein said limited cycle penalty is a one-cycle penalty.

* * * * *